United States Patent [19]
Cobb

[11] 4,023,530
[45] May 17, 1977

[54] POULTRY CAGE BOTTOM COVER

[76] Inventor: Richard H. Cobb, Rte. 4, Box 359-A, Hope, Alaska 72203

[22] Filed: Jan. 21, 1976

[21] Appl. No.: 651,051

[52] U.S. Cl. .................................. 119/17; 119/48
[51] Int. Cl.² ...................................... A01K 31/00
[58] Field of Search .................. 119/17, 19, 28, 48

[56] References Cited
UNITED STATES PATENTS

| | | | |
|---|---|---|---|
| 3,029,789 | 4/1962 | Fisher | 119/48 |
| 3,641,983 | 2/1972 | Keen et al. | 119/17 |
| 3,726,255 | 4/1973 | Marr | 119/17 |

*Primary Examiner*—Hugh R. Chamblee
*Attorney, Agent, or Firm*—Arnold, White & Durkee

[57] ABSTRACT

A grid cover for a wire cage bottom to eliminate the cage inhabitants' exposure to rust on the bottom of the cage. The cover comprises an overlay grid having cross members with longitudinal channels which substantially conform to and are aligned with the wire members of the grid-like configuration of the cage bottom. Similarly, openings between the cross members of the overlay grid are substantially aligned with the openings between wire members of the cage bottom.

3 Claims, 4 Drawing Figures

U.S. Patent  May 17, 1977  4,023,530
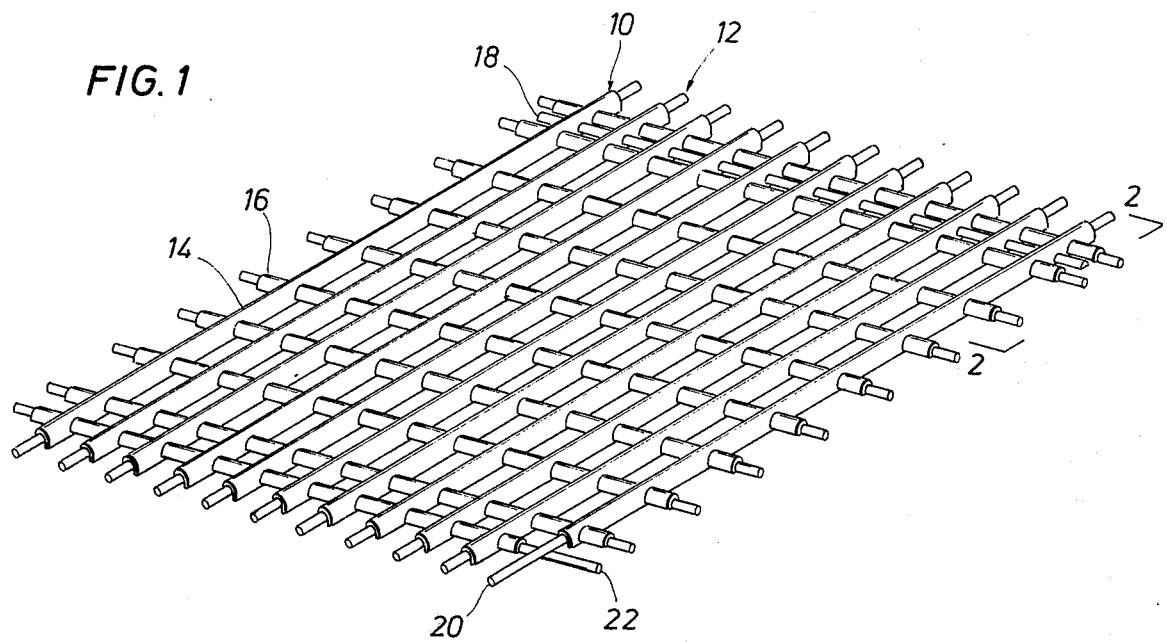
FIG. 1
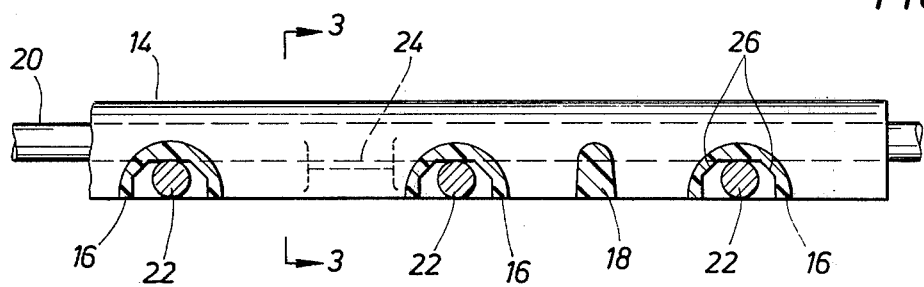
FIG. 2
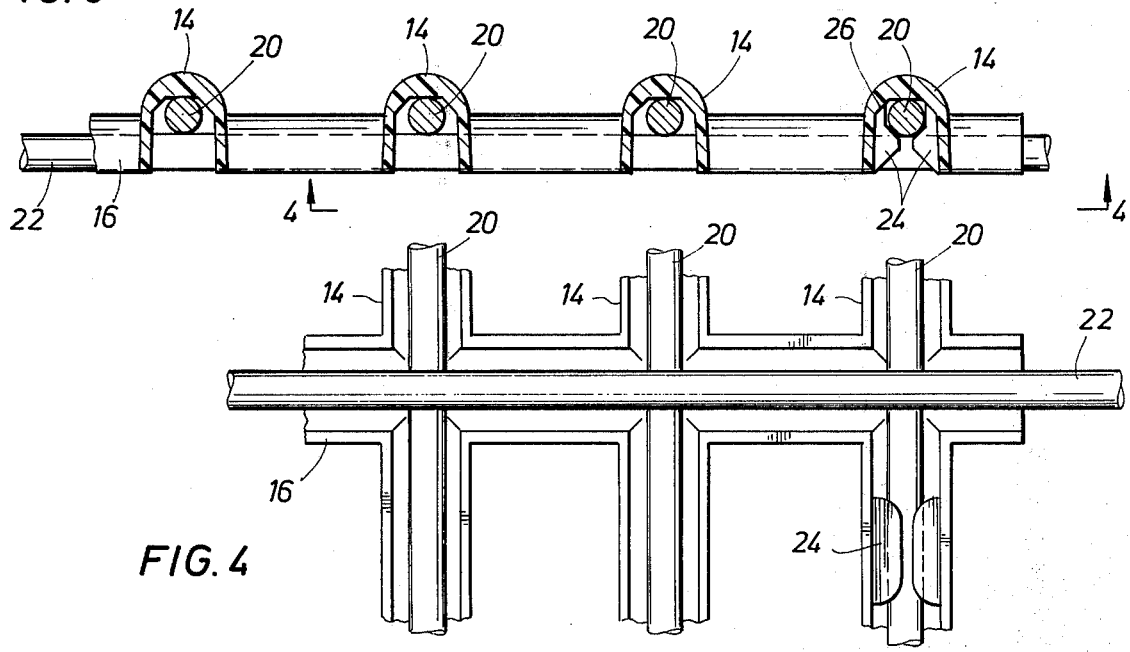
FIG. 3
FIG. 4

POULTRY CAGE BOTTOM COVER

BACKGROUND OF THE INVENTION

This invention relates to animal cages, more specifically, to cages used to house egg-laying hens after they have attained maturity.

Egg-producing hens are typically housed in a series of metal cages connected in a side-by-side arrangement. The rectangular cages are generally made of metal wire only—all four sides and the top and bottom. The wire construction of the cages is typically a one-inch by two-inch grid configuration, and the cages typically measure twelve by eighteen inches, with four hens to a cage. The bottom of the cage slopes downwardly toward the front of the cage to allow the eggs produced by the hens to roll to the collecting apron at the front, where the eggs will be collected by either manual pick-up or a conveyor. After hens in a modern egg-producing operation have attained sufficient maturity to produce eggs, they spend the remainder of their productive lives in these types of cages. Excrement from the hens in the cage is frequently cleaned out of the cages by the action of the hens moving therein, the one by two-inch grid of the cage floor being large enough to allow manure droppings to fall through. There may be an additional cleaning by "henhouse" caretakers. After several years of occupation and use by hens, the cages tend to develop some rust spots on the cage floors, due to continuous motion of the hens wearing off the original wire coating and thereby exposing the steel wire. As a result of the excrement of the hens and the cleaning which are carried out periodically, and of ordinary oxidation due to the environment, the wire cage bottoms begin to rust. An undesirable result—aside from the cage floor eventually becoming structurally weakened—is that the rust marks on the cages tend to leave rust marks on the eggs which are laid on the wire bottoms and which roll down the cage bottom into the cage apron. These rust marks cannot feasibly be removed from the eggs, and therefore render the eggs significantly less desirable to the consumer.

Typically, rust stained eggs are sold at greatly reduced prices to egg cracking plants for processing into powdered eggs or other egg derivative products. Further, when the rust problem becomes very extreme, the hen cages must be replaced or repaired. The procedure for repairing such cages requires that the connected cages in the building be removed for replacement of the worn bottoms, a costly and time consuming venture, to say nothing of the difficulty and inconvenience of having to move the hens from the cages during the repair operation.

Attempted solutions of the corrosion and rust problem have included the use of nylon mesh material for hen cage floors, and also various resilient mats, as, for example, in Marr U.S. Pat. No. 3,726,255 (spongy neoprene matt), Erfeling U.S. Pat. No. 3,760,769 (soft rubber or polyvinylchloride plastic floor grate), Barlocci U.S. Pat. No. 3,381,664 (snap-apart plastic cage), and Keen U.S. Pat. No. 3,641,983 (resilient mesh anti-blister mat). None of these attempted solutions has proven to be economically acceptable in that they are not feasible for widespread use in thousands of cages in a modern egg producing operation. For example, the Erfeling floor grate assembly and the Barlocci plastic cage both require relatively expensive materials and fabricating techniques. The Keen anti-blister cage mat, designed for use in connection with chickens raised for their meat production rather than egg production, is adapted for loose placement on a mesh cage floor, and does not allow for securing or locking the cage mat to the cage bottom. Similarly, the Marr cage mat is fabricated from a soft, resilient material, and cannot easily, if at all, be secured to the bottom of the cage. If the cage cover or mat is not secured to the cage bottom, then the wire bottom may continually become re-exposed to the hens and eggs laid by the hens, if the hens' motion tends to move the cage mat.

It is apparent that a cage floor covering is needed which can be used to inexpensively refurbish worn and rusted cage bottoms, substantially eliminate the rust problems, and provide an additional desirable characteristic of being more comfortable to the hens in the cages. The subject invention provides such an improvement in the art.

SUMMARY OF THE INVENTION

The subject invention comprises an overlay grid cover of injection molded polyethylene. The molded grid has cross members with longitudinal channels therein which substantially conform to and are aligned with the wire members of the grid-like configuration of the cage bottom on which the overlay grid is placed. Openings between the cross members of the overlay grid are likewise substantially aligned with the openings between the wire members of the cage bottom, and locking tabs are integrally molded into certain cross members.

The subject invention further comprises a method of covering and protecting a hen cage bottom from rust accumulation by eliminating exposure of the hens and eggs in the cage to the rust. To do so, the above-described overlay grid is injection molded and then placed into a hen cage in which rust marks have developed on the wire bottom. The overlay grid may also be placed into a new hen cage to prevent rust from developing, or if any does develop, to prevent such rust from coming in contact with the hens in the cage, and more importantly, the eggs laid by the hens.

BRIEF DESCRIPTION OF THE DRAWINGS

FIG. 1 is a perspective view of the preferred embodiment— a molded overlay grid—shown on the wire-grid cage floor.

FIG. 2 is an elevation view of a cross member of the overlay grid at the location shown in FIG. 1, and illustrates the difference in elevation of the intersecting cross members, and also the structural support member.

FIG. 3 is a cross section of the overlay grid at the location shown in FIG. 2, and illustrates the different elevations of the intersecting cross members, as well as a locking tab which secures the illustrated cross member section to a wire member of the cage bottom, thereby securing the overlay grid to the cage bottom.

FIG. 4 is a bottom view of the embodiment shown in FIG. 1, at the location shown in FIG. 3, and illustrates the overlay grid attached to the wire cage floor, showing a locking tab securing the overlay grid in place.

DESCRIPTION OF THE PREFERRED EMBODIMENT

The preferred embodiment of the subject invention comprises an injection molded polyethylene overlay grid designed to protect a wire grid hen cage floor. For applications after the wire bottom of the cage has become rusty, the purpose is to prevent additional rust accumulation, and to prevent rust marks from discoloring eggs which are laid and which roll across the hen cage bottom. For applications in new cages, the overlay grid serves to prevent virtually all rust from developing on the cage bottom.

The preferred embodiment comprises a plastic overlay grid having cross members with longitudinal channels through the members, the channels of the substantially tubular cross members being open to the lower side thereof. These channels substantially conform to and are aligned with the wire members of the grid-like configuration of the cage floor bottom, and the openings between the cross members of the overlay grid are substantially aligned with the openings between the wire members of the cage floor. The overlay grid is secured to the cage floor by locking tabs on the cross members of the overlay grid.

Secondarily, the invention comprises a method of protecting a hen cage bottom by eliminating exposure of hens and eggs to rust accumulations. In order to accomplish this end, the above-described overlay grid is injection molded and is then placed into a hen cage in which oxidation has resulted in undesirable rust marks accumulating (or into a new cage for which it is desirable to prevent any development of rust spots), the overlay grid being secured to the hen cage bottom by means of locking tabs molded into the cross members of the overlay grid.

In FIG. 1, the overlay grid 10 is shown on a removed section of the cage floor 12. The injection molded overlay grid 10 is comprised of integrally molded, parallel upper cross members 14, parallel lower cross members 16, and a support bar 18. The support bar 18 lends additional support to the overlay grid 10 and runs in the direction intersecting the upper cross members 14, and parallel to the lower cross members 16. When the overlay grid 10 is in place on the cage floor 12, the upper cross members 14 rest on the upper wire members 20 of the cage 12, while the lower cross members 16 rest on the lower wire members 22 of the cage floor 12. The support bar 18 is not in contact with any of the wire members of the cage bottom.

The cross members are of channel-like design, as shown in the cross section views of FIG. 2 (showing a side elevation of an upper cross member 14 and cross section views of several lower cross members 16, and also a cross section of the support bar 18) and FIG. 3 (showing a side elevation of a lower cross member 16 and a cross section view of several upper cross members 14, and also a locking tab 24 securing the rightmost upper cross member 14 to an upper wire member 20). As illustrated in FIGS. 2 and 3, the tubular channels inside the cross members are designed with adequate tolerance to accommodate slightly varying wire grid chicken cage floors, the molded shape of the channels having buttressed corners 26 (identified in FIGS. 2 and 3) for added strength.

FIG. 4, a bottom view of the elevation in FIG. 3, shows a portion of a lower cross member 16 and several upper cross members 14 secured on the upper wire members 20 and lower wire member 22 by the locking tab 24 securing the right-most upper cross member 14 to the upper wire member 20.

The locking member 24, shown in FIGS. 3 and 4, and by dotted lines in FIG. 2, prevents the overlay grid, which tends to remain in place by virtue of the cross members resting on the wires of the cage bottom, from being knocked out of place by sudden motions of the hens or a caretaker moving the hens or cleaning the cage bottom. Without locking tabs, the overlay grid could sometimes be knocked out of place, knocking the overlay out of alignment with the cage bottom wires, and possibly re-exposing the eggs to rust marks on the cage bottom wires. In placing the overlay grid onto the cage bottom, the locking tabs are simply snapped over those wire members with which they come in contact.

In order to prevent—with a substantial reliability factor—eggs from being stained by rusty cage bottoms, the cage bottom cover must always remain in place covering all wire members of the wire grid bottom. The subject invention does this, and thus serves to prevent new cage bottoms from becoming rusted, thereby eliminating the possibility of rust mark developing and staining eggs produced by the hens in the cages. More importantly, the plastic overlay grid prevents rust on old cage bottoms from contacting and staining eggs and helps to prevent further rust development on such old cage bottoms. Similarly, the overlay grid prolongs the life of cages since it is no longer necessary— for the purpose of protecting the eggs from rust—to replace the cages or the cage bottoms once they become rusted. The overlay grid further serves to prolong the life of the cage bottoms by minimizing structural weaknesses due to rusting of the wire cage bottoms.

The overlay grid also serves to reduce the number of cracked eggs since the eggs no longer roll directly on the metal cage bottoms, but rather roll on the slightly cushioned plastic overlay. The plastic overlay grid is not of a soft or spongy composition, but does provide some cushioning effect due to its elasticity, and also due to the fact that there is generally some slight movement of the overlay with respect to the wire cage bottom. Similarly, the overlay grid reduces fatigue of the egg producing hens since the hens can more comfortably rest on the larger diameter plastic overlay members than they can on the smaller diameter metal wires which form the cage bottom.

Use of the subject invention to repair old cages whose bottoms have become rusted is the most feasible method of solving the problem of rusted cage bottoms, and is believed to provide approximately a 50% reduction in material cost of cage repair (typically bottom replacement), and an 80% reduction in repair time consumed by conventional repair techniques, as the plastic overlay grid need only be snapped in over the existing cage bottom, with no complicated removal of multiple cages.

In view of the preceding description of a particular preferred embodiment, further modification and alternative embodiments of this invention will be apparent to those skilled in the art. Accordingly, the preceding description is to be construed as explanatory and illustrative only, and is for the purpose of teaching and enabling those skilled in the art to make and use the invention. The preferred embodiment of the invention shown and described herein is to be understood to be the best mode presently contemplated, but is by no means the only embodiment possible. Various changes may be made in the mere shape or size of the overlay grid members. Equivalent materials may be substituted for polyethylene or other plastics used in the preferred embodiment, and certain features of the invention may be used independently of others. For example, the overlay grid may be used without the locking tabs, but it will still remain substantially in place under most ordinary conditions. The scope of the invention is defined by the following claims, and also all equivalent modifications and variations which fall within the true spirit and scope of the invention.

What is claimed is:

1. A non-metallic cage bottom grid cover for isolating caged bird inhabitants and their eggs from rust on the wires of the cage bottom and for preventing further rusting of such wires, said cover including curvilinearly rounded longitudinal channel means in a first direction and curvilinearly rounded longitudinal channel means in a second direction intersecting said first channel means for overlaying securement with respective grid-like configured wires in the cage bottom, the openings between said cover channel means permitting waste flushing liquids to pass therethrough and providing the collection of eggs in the cage without contact with the bottom cage wires, and locking tabs within at least some of said channel means for securing said cover to the respective wires of the cage bottom, and wherein the channel means running longitudinal in said first direction are higher than the channel means running longitudinal in said second grid direction whereby wires of the cage bottom are engaged within respective channel means to prevent lateral shifting of said cover.

2. The grid cover in accordance with claim 1, wherein said cover is of injection-molded polyethylene.

3. The grid cover in accordance with claim 1, wherein said locking tabs are molded into the channel means of said cover.

* * * * *